United States Patent
Dasgupta et al.

(10) Patent No.: US 12,516,356 B2
(45) Date of Patent: Jan. 6, 2026

(54) PROCESS FOR THE DETOXIFICATION OF LIGNOCELLULOSIC HYDROLYSATE AND ITS USE IN SYNTHESIZING XYLITOL

(71) Applicant: COUNCIL OF SCIENTIFIC AND INDUSTRIAL RESEARCH, New Delhi (IN)

(72) Inventors: Diptarka Dasgupta, Dehradun (IN); Asmita Ashutosh Prabhune, Pune (IN); Snehal Vijay More, Pune (IN); Debashish Ghosh, Dehradun (IN); Bhaskar Thallada, Dehradun (IN); Anjan Ray, Dehradun (IN); Arushdeep Sidana, Dehradun (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 400 days.

(21) Appl. No.: 18/256,012

(22) PCT Filed: Dec. 6, 2021

(86) PCT No.: PCT/IN2021/051139
§ 371 (c)(1),
(2) Date: Jun. 5, 2023

(87) PCT Pub. No.: WO2022/118344
PCT Pub. Date: Jun. 9, 2022

(65) Prior Publication Data
US 2024/0052378 A1 Feb. 15, 2024

(30) Foreign Application Priority Data
Dec. 4, 2020 (IN) .............................. 202011053110

(51) Int. Cl.
*C12P 7/18* (2006.01)

(52) U.S. Cl.
CPC ............. *C12P 7/18* (2013.01); *C12P 2203/00* (2013.01)

(58) Field of Classification Search
CPC ...... C12P 7/18; C12P 2201/00; C12P 2203/00
See application file for complete search history.

(56) References Cited

U.S. PATENT DOCUMENTS

| 7,625,728 B2 | 12/2009 | Eroma et al. |
| 2012/0021467 A1 | 1/2012 | Zhang et al. |
| 2015/0159180 A1 | 6/2015 | Prabhune et al. |

FOREIGN PATENT DOCUMENTS

| BR | PI1103821 A2 | 11/2013 |
| WO | 2013183962 A1 | 12/2013 |

OTHER PUBLICATIONS

Jeevan et al., "Microbial Production of Xylitol from Corn Cob Hydrolysate Using Pichia SP," Advances in Environmental Biology, (2011); vol. 5, (No. 11), 3613-3619.

Li et al., "Xylitol Production by Candida Tropicalis from Corn Cob Hemicellulose Hydrolysate in a Two-Stage Fed-Batch Fermentation Process," J. Chem. Technol. Biotechnology, (2012), vol. 87, 387-392.

Mussatto et al., "Alternatives for Detoxification of Diluted-Acid Lignocellulosic Hydrolyzates for Use in Fermentative Processes: A Review," Bioresource Technology, (2004), vol. 93, 1-10.

International Search Report for International Application No. PCT/IN2021/051139; International Filing Date—Dec. 6, 2021; Date of Mailing—Feb. 28, 2022; 2 pages.

*Primary Examiner* — Tekchand Saidha
(74) *Attorney, Agent, or Firm* — CANTOR COLBURN LLP

(57) ABSTRACT

The present invention relates to a process for the detoxification and concentration of xylose rich biomass derived liquid hydrolysate and its application as a substrate for the synthesis of crystalline and pure xylitol.

6 Claims, 11 Drawing Sheets

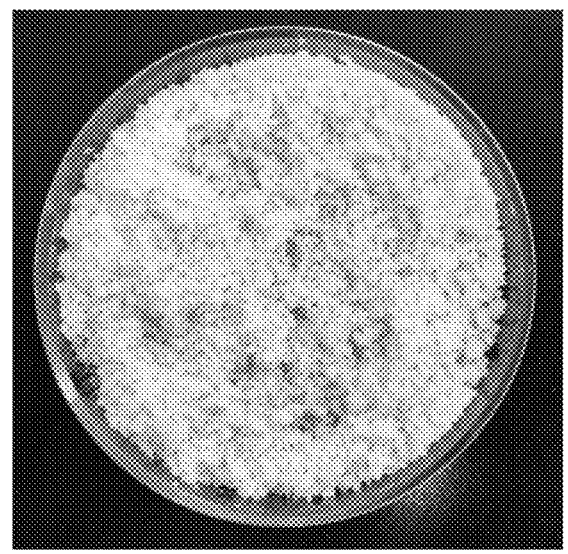
Figure 5
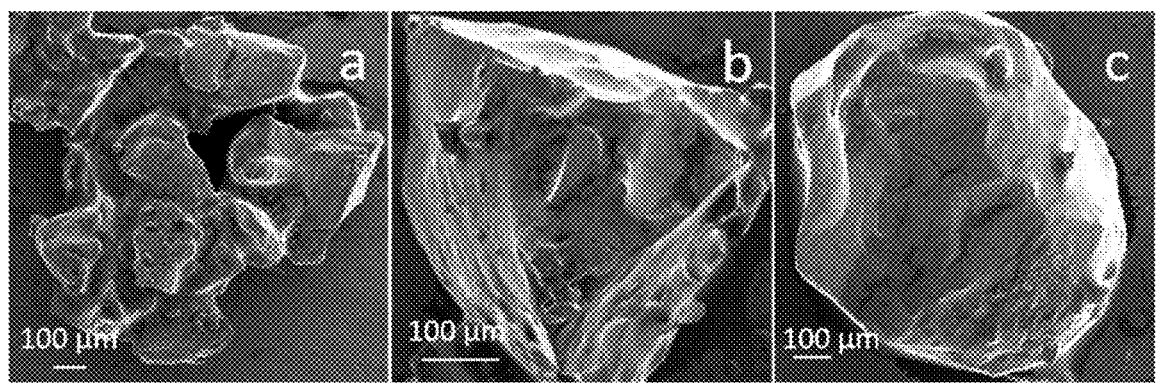
Figure 6 a-c

PROCESS FOR THE DETOXIFICATION OF LIGNOCELLULOSIC HYDROLYSATE AND ITS USE IN SYNTHESIZING XYLITOL

CROSS-REFERENCE TO RELATED APPLICATIONS

This Application is a U.S. National Stage Application of PCT/IN2021/051139, filed Dec. 6, 2021, which claims the benefit of India application No. 202011053110 filed, Dec. 4, 2020, both of which are incorporated by reference in their entirety.

FIELD OF THE INVENTION

The present invention relates to a process for the detoxification of lignocellulosic hydrolysate and its use in synthesizing xylitol. Particularly, the present invention relates to a process for the detoxification and concentration of xylose rich biomass derived liquid hydrolysate and its application as a substrate for the synthesis of crystalline and pure xylitol.

BACKGROUND OF THE INVENTION

Xylitol is a $C_5$ sugar alcohol that finds a wide variety of applications in diverse areas such as food, cosmetics, oral and hygiene products, and also in many pharmaceutical formulations. With relative sweetness equivalent to Sucrose, it has $\frac{1}{3}^{rd}$ less calorie content and used as a sugar substitute for diabetic patients and in parenteral application to trauma patients because of its non-reactive nature. Due to its multiple benefits primarily in the food markets, the demand for xylitol has steadily increased worldwide. Xylitol has a global market demand of ~200 MMT, which is forecasted to rise to ~300 MMT by 2030, with a market value of US $1.37 billion.

The current industrial method for xylitol production involves catalytic hydrogenation of xylose rich broth (derived from lignocellulosic biomass) under high temperature and pressure. The process requires extensive treatment to generate ultrapure feed and severe reaction conditions for catalytic conversion, which makes the technology very expensive and energy-intensive. Besides, several by-products are formed during the hydrogenation reaction due to low catalyst selectivity, which makes the downstream product recovery extremely difficult and costly. To mitigate the above problems and meet the growing xylitol demand, alternative production strategies through biotechnology route that provide high yield and have low severity have been envisaged.

Patent U.S. Pat. No. 7,625,728B2 issued to Danisco Sweeteners describes the simultaneous production of ethanol and xylitol from renewable biomass such as birch chips. The xylan-containing matter in biomass comprising pentose and hexose, is processed by hydrolysis or partial hydrolysis to produce a processed solution comprising free pentoses and hexoses for the production of xylitol using yeast of the genera *Candida*, *Pichia*, *Pachysolen*, or *Debaryomyces* under ambient temperature conditions (30° C.). The process involves the use of chromatographic separation such as ion exchange purification to remove impurities in the hydrolysate solution before fermentation, and the reported xylitol yields are low (20.6 g/L).

US patent 0159180 A1 issued to Prabhune et al. discloses a method for the production of xylitol from xylose using *Pichia* sp as the biocatalyst. However, the patent describes xylitol production from synthetic xylose solution and does not include any lignocellulosic feedstock as a source of xylose.

US patent 20120021467A1 issued to Thomson Biotech PTE Ltd. claims the production of xylose and arabinose simultaneously from hemicellulosic hydrolysates. The xylose rich liquid hydrolysate obtained after acid pretreatment is detoxified using a combination of *Issatchenkia* sp strains for removal of fermentation inhibitors. The detoxified hydrolysate is concentrated through vacuum evaporation and finally fermented into xylitol using *Candida tropicalis* with high product yield (0.89 to 0.93 g/g).

In the past, Li et al. (J Chem Technol Biotechnol, 2012; 87, 387-392) described xylitol production from corncob hydrolysate in a two-stage fermentation strategy in a 5 L bioreactor. The authors reported detoxification of hydrolysate using activated charcoal in a ratio of 40:1 (v/w), which was selectively fermented to xylitol with a maximum titer of 96.5 g/L and a yield of 0.83 g/g.

In another study, Jeevan et al. (Advances in Environmental Biology; 2011; 5, 3613-3619) reported xylitol production from corn cob hydrolysate using *Pichia* sp. The maximum xylitol titer obtained is 35 g/L, which is significantly low compared to other literature reported data.

The published patents and papers in prior art describe the use of ion exchange-based systems for purifying the lignocellulosic hydrolysate and employ vacuum evaporation to concentrate the liquid stream, which overall increases the cost of xylitol production. Also, the prior art literature involves the use of different biocatalysts to separately ferment hexose and pentose generated during biomass hydrolysis. Thus, there is a need in the art for developing a system that can simultaneously perform lignocellulosic hydrolysate detoxification and concentrate the treated stream for downstream fermentation and requires a single efficient biocatalyst that can selectively ferment xylose into xylitol without the formation of by-products derived from other monomeric sugars in the broth.

OBJECTS FOR THE INVENTION

Main objective of the present invention is to provide a simultaneous process for the detoxification and concentration of xylose rich biomass derived liquid hydrolysate using a custom-designed glass chamber utilizing sunlight as the energy source.

Another objective of the present invention is to provide a process for the production of crystalline xylitol from non-edible lignocellulosic biomass using a whole-cell biocatalyst.

Yet another objective of the present invention is to provide a biocatalytic process that produces xylitol from lignocellulosic biomass hydrolysate with high yields and selectivity.

SUMMARY OF THE INVENTION

Accordingly, present invention provides a process for the simultaneous detoxification and concentration of xylose rich biomass derived liquid hydrolysate using a custom-designed glass chamber, wherein said process comprises the steps of:
  i. hydrolysing the biomass for the pretreatment by using dilute sulphuric acid, wherein the ratio of biomass and sulphuric acid is 1:8 at a temperature in the range of 138° C.-140° C. with a holding time period in the range of 85-90 minutes at 100-120 rpm to obtain biomass slurry;

ii. passing the discharged biomass slurry as obtained in step i) through a squeezer for solid-liquid separation to obtain xylose rich liquid solution;

iii. keeping the xylose rich liquid solution as obtained in step ii) in the solar concentrator and exposing to sunlight at a temperature in the range of 25° C. to 45° C. for a period in the range of 47-48 hours to obtain the substantially furfural free xylose rich acid hydrolysed detoxified hydrolysate.

In an embodiment of the present invention, said detoxification and concentration process resulted in removal of ~95% of furfural in the acid hydrolysed xylose rich lignocellulosic composition.

In another embodiment of the present invention, said detoxification and concentration process resulted in removal of ~99% of furfural in the acid hydrolysed xylose rich lignocellulosic composition.

In yet another embodiment, present invention provides a process for the production of crystalline xylitol from detoxified and concentrated lignocellulosic biomass obtained by a process as claimed in claim 1, in the presence of a whole-cell biocatalyst, wherein the process comprises the steps of:

a) concentrating the dotoxified and concentrated xylose rich biomass derived liquid hydrolysate broth further by using a rotary vacuum evaporator to achieve a xylose concentration of 66, 100 and 150 g/L;

b) monitoring the xylitol production from concentrated biomass hydrolysate (at varying xylose concentration) obtained at step a) by *Pichia caribicca* MTCC 5703 strain in a bioreactor with a supervisory control and a data acquisition (SCADA) system;

c) controlling the fermentation parameters by maintaining the biomass obtained at step b) at a temperature in the range of 28-30° C., agitation at 150-200 rpm, and the pH of the system at 6.0-6.5;

d) allowing the cells to settle down of the biomass obtained at step c) after fermentation;

e) siphoning out the xylitol rich broth obtained at step d) from the fermenter and decolorizing by activated carbon treatment (5% w/v);

f) filtering and concentrating the filtrate with a xylitol content of 8-12% by weight obtained at step e) in a rotary evaporator at 80° C. under vacuum (0.5 atm) to achieve a xylitol content of 80-90% by weight;

g) cooling the filtrate obtained at step f) gradually from 60° C. to 25° C. over a period of about 1-2 hours while controlling the temperature and then keeping at a temperature in the range of −20° C. to 0° C. for 5 days to complete the crystallization of xylitol;

h) separating and drying the crystals to obtain crystalline xylitol.

In yet another embodiment of the present invention, said produced xylitol from lignocellulosic biomass hydrolysate is with high yields and selectivity, wherein the maximum yield is 0.87 g/g with a product selectivity of >96%.

In yet another embodiment of the present invention, said process results in ~85% xylitol recovery from the broth in the form of crystals with a degree of purity of >96.9%.

In yet another embodiment of the present invention, wherein the Xylitol crystals demonstrated no toxic effect on HepG2 cell lines when assayed for cytotoxicity studies.

The present invention provides a simultaneous process for the detoxification and concentration of xylose rich biomass derived liquid hydrolysate and production of crystalline xylitol from detoxified and concentrated lignocellulosic biomass using a whole-cell biocatalyst.

In an embodiment, the present invention provides a simultaneous process for the detoxification and concentration of xylose rich biomass derived liquid hydrolysate using a custom-designed glass chamber utilizing sunlight as the energy source. The xylose rich liquid hydrolysate obtained from acid and steam explosion of lignocellulosic biomass is detoxified and concentrated in a customized glass chamber using sunlight as the energy source. The detoxified lignocellulosic biomass is substantially free of furfural.

Another embodiment of the present invention provides a process for the production of crystalline xylitol from lignocellulosic biomass using a whole-cell biocatalyst, wherein the process comprises of fermenting the detoxified and concentrated biomass hydrolysate to xylitol by using a generally regarded as safe (GRAS) organism *Pichia caribicca* MTCC 5703.

Another aspect of an embodiment is to provide a biocatalytic process that produces xylitol from lignocellulosic biomass hydrolysate with high yields and selectivity, wherein the maximum yield is 0.87 g/g with a product selectivity of >96%. Single-step crystallization results in ~85% xylitol recovery from the broth in the form of crystals with a degree of purity of >96.9%. The crystals demonstrated no toxic effect on HepG2 cell lines when assayed for cytotoxicity studies.

BRIEF DESCRIPTION OF THE DRAWINGS

FIG. 5 represents xylitol crystals recovered from the fermentation broth FIG. 6 represents a-c SEM images for recovered xylitol crystals

DETAILED DESCRIPTION OF THE INVENTION

The present invention provides a simultaneous process for the detoxification and concentration of xylose rich biomass derived liquid hydrolysate using a custom-designed glass chamber utilizing sunlight as the energy source. The xylose rich liquid hydrolysate obtained from acid and steam explosion of lignocellulosic biomass is detoxified and concentrated in a customized glass chamber using sunlight as the energy source. The detoxified lignocellulosic biomass is substantially free of furfural.

The lignocellulosic biomass is obtained from any agricultural waste, preferably from corn cob or sugarcane bagasse.

Source of corn cob and sugarcane bagasse:
1. Corncob: Farmland in Arki town, Distric Solan, HP (Coordinates of the field: 31° 9'29.6539° N, 76° 58'20.9953° E).
2. Sugarcane bagasse: Local sugar mill in Doiwala, Uttarakhand (Co-ordinates: 30° 10'11"N 78° 7'23"E.

The process for the detoxification and concentration of xylose rich biomass derived liquid hydrolysate comprises the steps of:
i. hydrolysing the biomass for the pretreatment by using dilute sulphuric acid, wherein the ratio of biomass: sulphuric acid is 1:8 at a temperature in the range of 138° C.-140° C. with a holding time period in the range of 85-90 minutes at 100-120 rpm;
ii. passing the discharged biomass slurry obtained at step i) through a squeezer for solid-liquid separation to obtain xylose rich liquid solution
iii. keeping the xylose rich composition obtained at step ii) in the solar concentrator and exposing to sunlight at a temperature in the range of 25° C.-45° C. for a period in the range of 47-48 hours to obtain the substantially furfural free xylose rich acid hydrolysed detoxified hydrolysate.

The detoxification process resulted in removal of ~95% of furfural in the acid hydrolysed xylose rich lignocellulosic composition or broth.

The detoxification process resulted in removal of ~99% of furfural in the acid hydrolysed xylose rich lignocellulosic composition or broth.

Figure 1A:
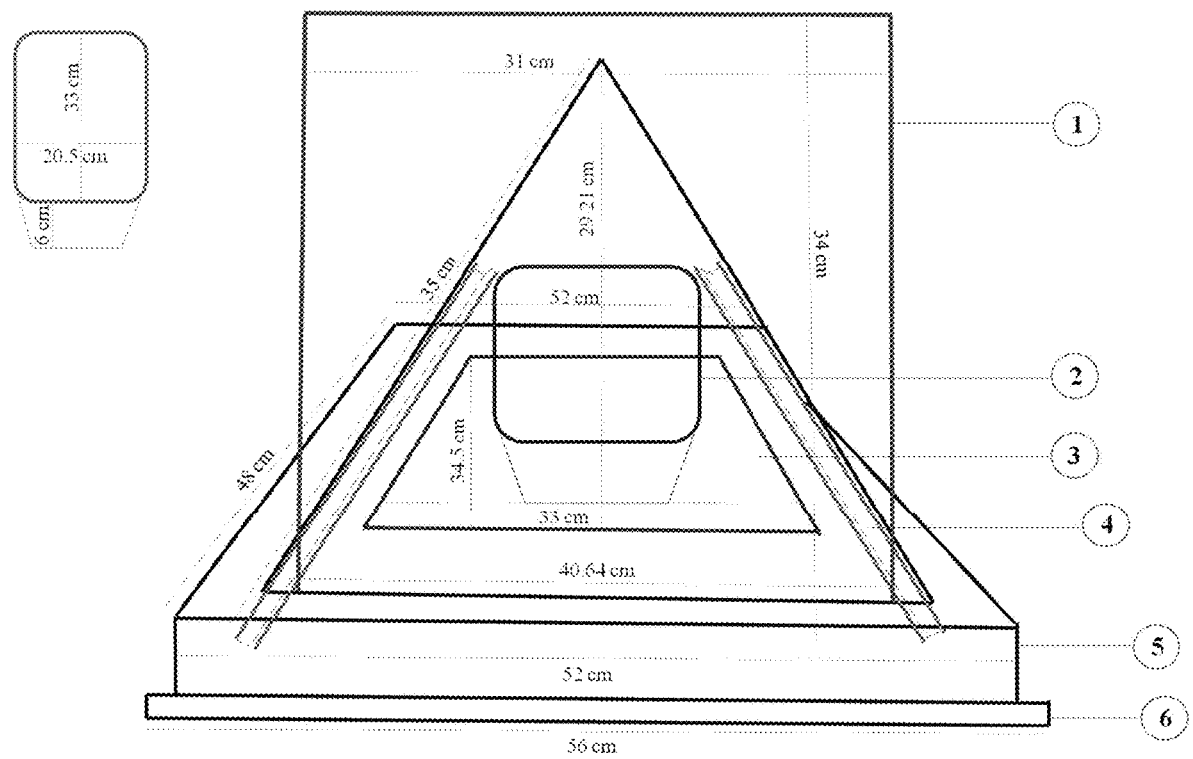
FIG. 1 a) represents the front view of a designed or customized glass chamber with dimensions (in cm) for detoxification of hydrolysate and furfural removal and concentrating the feed wherein: 1—Removable glass wall; 2—Borosilicate glass tray; 3—Tin sheet coated with black paint; 4—PVC casing; 5—Polyethylene foam; 6—Plywood; b) represents the side view of the glass chamber with dimensions (in cm) wherein the numbers indicate: Removable glass wall; 2—Borosilicate glass tray; 3—PVC casing; 4—Tin sheet coated with black paint; 5—Polyethylene foam; 6—Plywood; c) represents the top view of the glass chamber with dimensions (in cm) wherein the nubers indicate: 1—Borosilicate tray; 2—Black paint coated tin sheet; 3—Condensate collectors; 4—Thermocol base; 5—Plywood base.
Figure 1B:
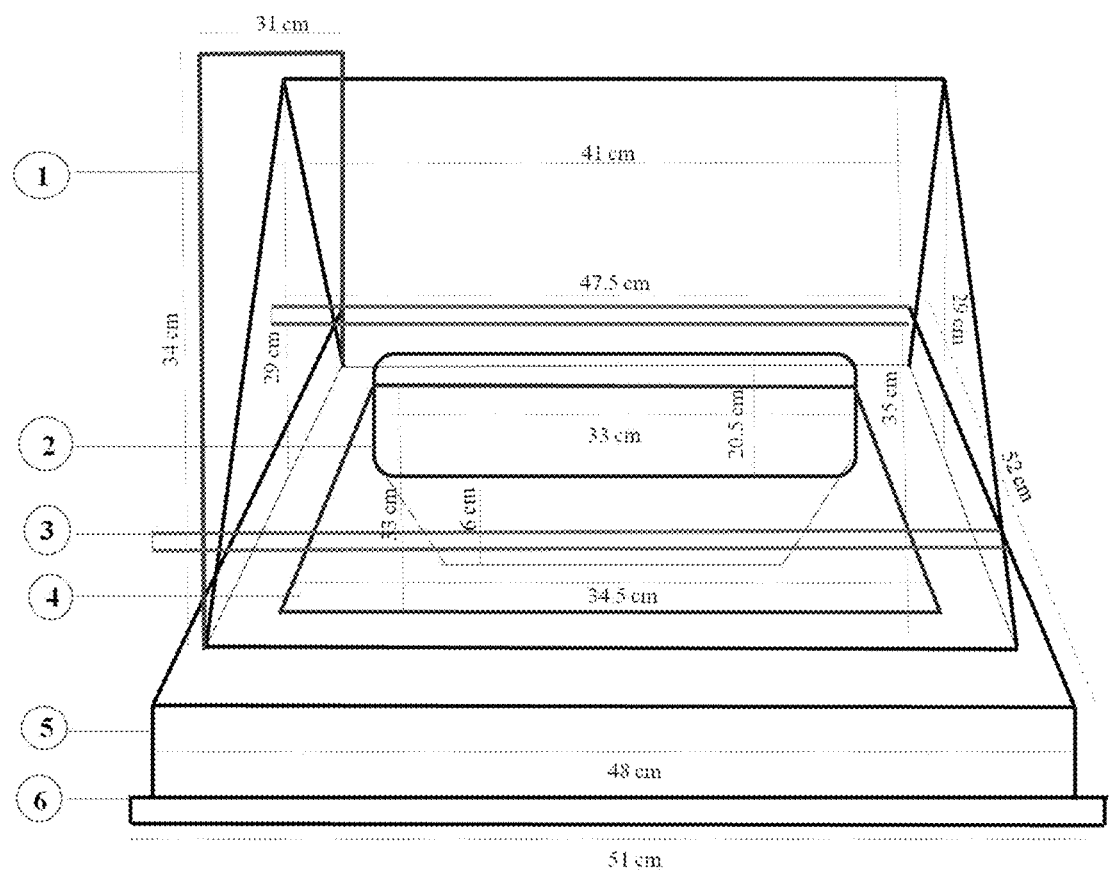
Figure 1C:
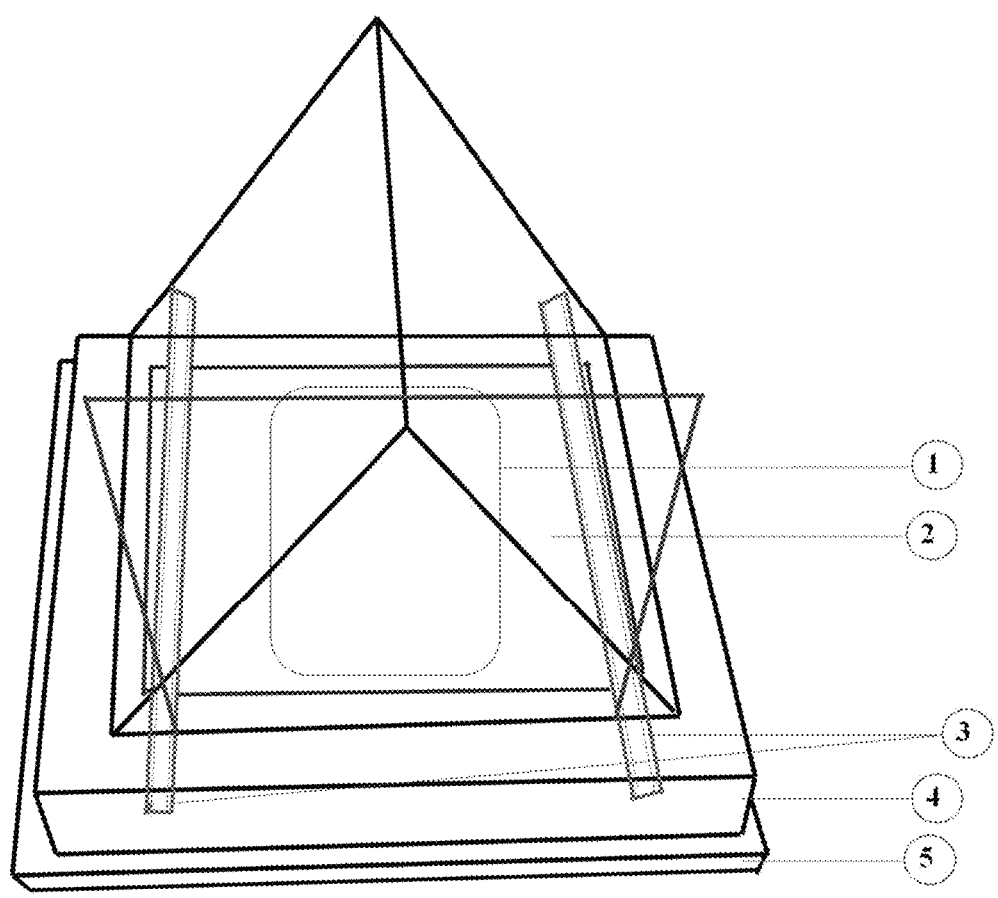

Several experiments have been conducted by using detoxified and non-detoxified lignocellulosic hydrolysate for different time period. Experimental results with detoxified and non-detoxified lignocellulosic hydrolysate are summarised below in Table-1:

A glass chamber termed as "solar concentrator" at step iii) is designed or customized or tailored to detoxify and concentrate the hydrolysate obtained as described above. The structure is illustrated in FIG. 1 *a-c*. It comprises of two rectangular glass panels on either side, and two triangular panels at either end joined to form a trapezoidal structure fixed on a wooden base with an overall Length:Width: Height ratio of 1.62:1.38:1. Referring to FIG. 1 *a*, the solar concentrator comprises a removable glass wall (1); a Borosilicate glass tray (2); a PVC casing (3); Tin sheet coated with black paint (4); a polyethylene foam (5) and Plywood (6). The panel on the front is movable vertically to allow entry of sample tray inside the glass chamber. The junctions between the glass panels and the supporting base structure is sealed with insulating tapes. The walls of the structure allow entry of incident sunlight and prevent exposure to any external air, rain, or moisture. The bottom of the chamber comprises of a tin base coated with black paint to absorb incident sunlight. Two drain pipes are placed on the two walls to collect and drain any evaporated water in pure form.

Present invention provides a process for the production of crystalline xylitol from lignocellulosic biomass using a whole-cell biocatalyst. The novel mesophilic yeast utilizes the glucose in liquid hydrolysate for cell biomass accumulation and/or NADPH regeneration, which is utilized as a cofactor for xylose reduction into xylitol with high conversion efficiency.

In an embodiment, the present invention provides a process for the production of crystalline xylitol from lignocellulosic biomass using a whole-cell biocatalyst, wherein the process comprises of fermenting the detoxified and concentrated biomass hydrolysate to xylitol by using a generally regarded as safe (GRAS) organism *Pichia caribicca* MTCC 5703.

The biocatalyst *Pichia caribicca* MTCC 5703 is evaluated for its efficacy when recycled. The biocatalyst synthesized xylitol with no substantial effect on its yield over 500 hours, also refer FIG. 5.

The process comprises the steps of:
a) concentrating the dotoxified and concentrated xylose rich broth further by using a rotary vacuum evaporator to achieve a xylose concentration of 66, 100 and 150 g/L;
b) investigating the xylitol production from concentrated biomass hydrolysate (at varying xylose concentration) obtained at step a) by *Pichia caribicca* MTCC 5703 strain in a bioreactor with a supervisory control and a data acquisition (SCADA) system;
c) controlling the fermentation parameters by maintaining the biomass obtained at step b) at a temperature in the

TABLE 1

Effect of detoxification on xylitol production by the biocatalyst

| Corncob hydrolysate without detoxification | | | | | Detoxified corncob hydrolysate | | | | |
| --- | --- | --- | --- | --- | --- | --- | --- | --- | --- |
| Time (h) | Xylose (g/L) | Glucose (g/L) | Xylitol (g/L) | Furfural (g/L) | Time (h) | Xylose (g/L) | Glucose (g/L) | Xylitol (g/L) | Furfural (g/L) |
| 0 | 31.45 | 3.79 | 0 | 2.4 | 0 | 65.07 | 6.9 | 0 | 0 |
| 22 | 29.62 | 2.75 | 0 | 1.48 | 19 | 51.06 | 0 | 10.61 | 0 |
| 46 | 28.64 | 2.54 | 0 | 1.19 | 43 | 38.41 | 0 | 18.42 | 0 |
| 96 | 28.6 | 2.23 | 0 | 1.19 | 68 | 23.62 | 0 | 29.73 | 0 |
| | | | | | 96 | 15.74 | 0 | 34.594 | 0 |
| | | | | | 114 | 6.689 | 0 | 46.406 | 0 | range of 28-30° C., agitation at 150-200 rpm, and the pH of the system at 6.0-6.5;

d) allowing the cells to settle down of the biomass obtained at step c) after fermentation;

e) siphoning out the xylitol rich broth obtained at step d) from the fermenter and decolorizing by activated carbon treatment (5% w/v);

f) filtering and concentrating the filtrate with a xylitol content of 8-12% by weight obtained at step e) in a rotary evaporator at 80° C. under vacuum (0.5 atm) to achieve a xylitol content of 80-90% by weight;

g) cooling the filtrate obtained at step f) gradually from 60° C. to 25° C. over a period of about 1-2 hours while controlling the temperature and then keeping at a temperature in the range of −20° C. to 0° C. for 5 days to complete the crystallization of xylitol;

h) separating and drying the crystals to obtain crystalline xylitol.

Present invention provides a biocatalytic process that produces xylitol from lignocellulosic biomass hydrolysate with high yields and selectivity, wherein the maximum yield is 0.87 g/g with a product selectivity of >96%. Single-step crystallization results in ~85% xylitol recovery from the broth in the form of crystals with a degree of purity of >96.9%. The crystals demonstrated no toxic effect on HepG2 cell lines when assayed for cytotoxicity studies.

As the initial xylose concentration in the broth increased, the xylitol yield increased linearly up to 100 g/L, after which a slight decrease in the return is observed. This indicates that initial xylose concentration in the broth has an influence on the xylitol yield.

FIG. 5 depicts $^{13}$C NMR for Xylitol crystals. 50 mg of the crystals (FIG. 5) are suspended in 600 μL of deuterated water and subjected to $^{13}$C NMR for structural confirmation.

Figure 7:
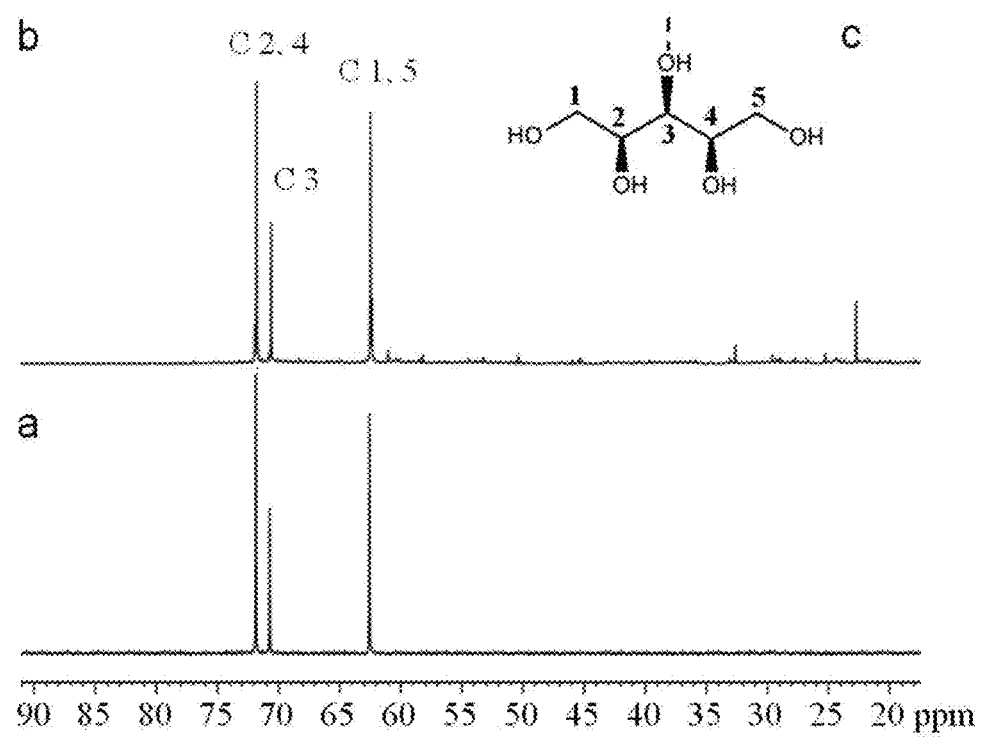
FIG. 7 represents $^{13}C$ NMR spectra of (a) commercial xylitol crystals from Himedia with a degree of purity of 98% compared to (b) xylitol produced through fermentation from lignocellulosic hydrolysate.
Figure 8:
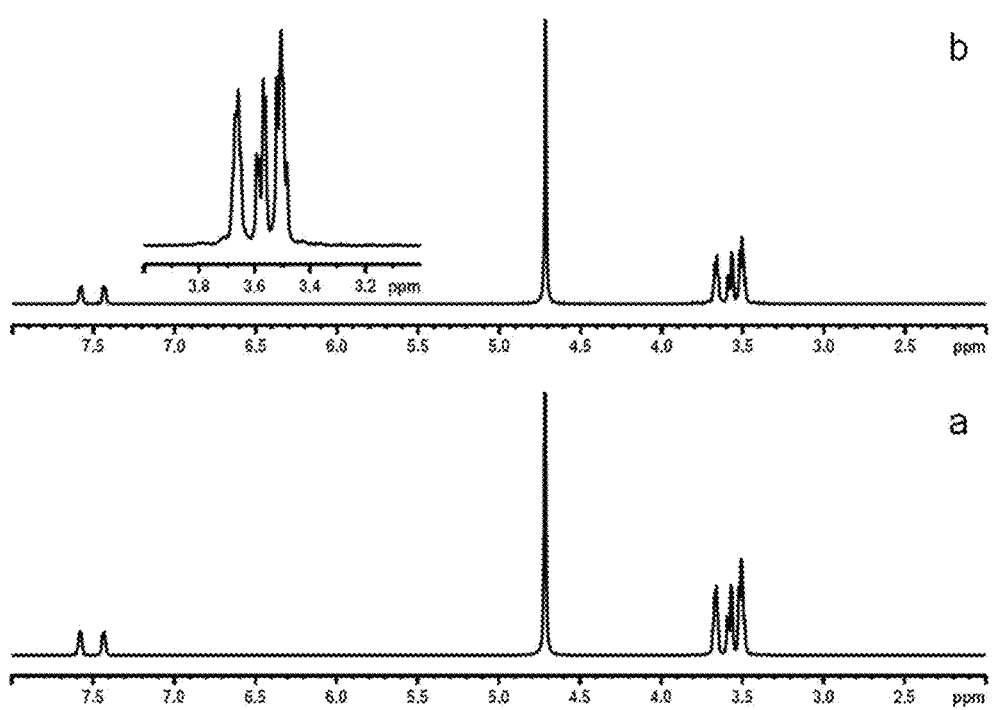
FIG. 8 represents $^1H$ NMR spectra of (a) commercial xylitol crystals compared to (b) xylitol crystals produced through fermentation.

Quantitative $^{1}$H NMR (Bruker Avance III, Switzerland) is done to estimate the degree of purity with potassium phthalate as the standard reference material (SRM), refer FIGS. 7 and 8.

Figure 9:
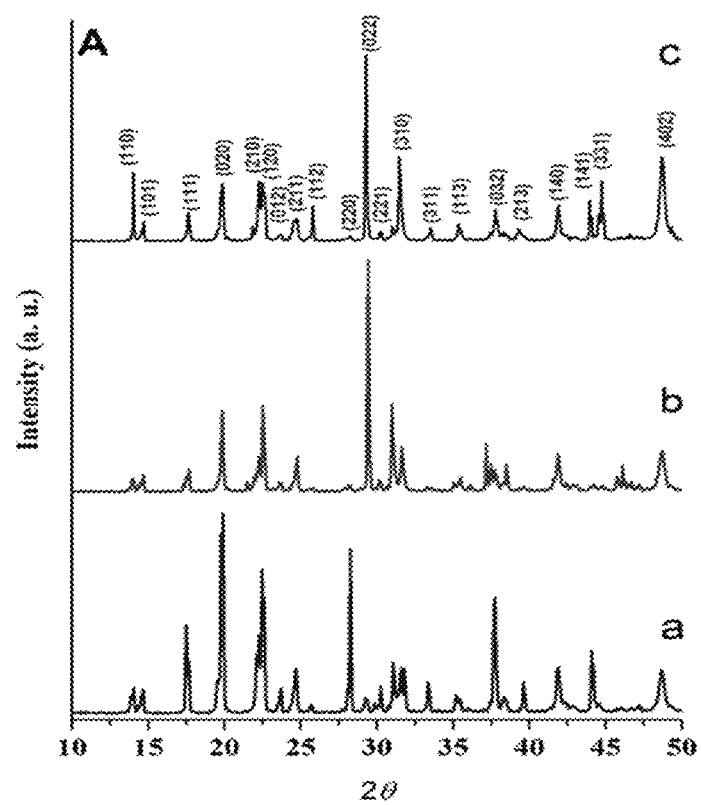
FIG. 9 represents XRD patterns of (a) commercially available xylitol and (b-c) xylitol produced through fermentation and recovered at different crystallization temperatures.

For further characterization by SEM and XRD, refer FIGS. 6 and 9 respectively.

The SEM micrograms (in FIG. 6, *a-c*) shows a myriad of small microcrystalline molecules with an average crystal size of 400-600 μm. The recorded micrographs are highly charged and heavily agglomerated form with tight packing, which corroborated to the crystal structure elucidated in XRD analysis. The $^{13}$C-NMR spectrums (FIG. 7*b*) demonstrated 3 characteristics peaks in $^{13}$C-NMR: δ=74 (m,1C), 72.3 (m, 2C), 64.4 (m, 2C) for the recovered crystals. A single peak near to 64.4 represented two-terminal CH$_2$ groups in the molecule. A small peak at 72.3 ppm with an intense signal observed at 74 ppm represented the C$_3$ and C$_2$ carbon atom respectively within the molecule, which confirmed its structure as xylitol (FIG. 7*b*). $^{1}$H NMR analysis (FIGS. 8 *a* and *b*) revealed that the purity of the obtained crystals was 96.9% and resembled the commercial crystals (purity of 98%). The crystals had a moisture content of less than 1% with xylose (1.5% w/w) and glycerol (2% w/w), accounting for the impurities.

Powdered X-ray diffractions showed a high impact on the crystallinity of the xylitol produced via biocatalytic route when compared to the commercially available xylitol. The XRD pattern of xylitol processed through bio-catalytic route (FIG. 9, *b-c*) shows peaks at 2θ of 15.6°, 18.7°, 20.3°, 23.6°, and 27.1° which attribute to (331), (511), (440), (533) and (642) planes of xylitol crystals—type cubic system belonging Fd3m space group (JCPDS Card No. 39-1380; lattice parameter a=24.681 Å). With respect to commercial xylitol, the X-ray diffraction pattern found identical. The only significant change found, is in the intensity of the peaks, where the intensity of some peaks undergoing reduction while others being increased compared with the commercial xylitol crystals. Comparing the X-ray diffraction patterns (commercial and bio-catalyzed xylitol), one can assume, the commercial crystals are exposed with (020) and (220) planes whereas the as prepared xylitol was preferentially presented with (022) plane. Table-2 below summarizes the data related to composition analysis of xylitol.

TABLE 2

Compositional analysis of xylitol

| Component | Recovered crystals | Commercial crystals |
|---|---|---|
| Xylitol (wt %) | 96.9 | 98.0 |
| Other polyols (wt %) | Not detected | <1.5 |
| Xylose (wt %) | <1.0 | <0.5 |
| Glycerol (wt %) | <1.0 | Not detected |
| Moisture content (wt %) | <1.0 | <0.5 |

Figure 10:
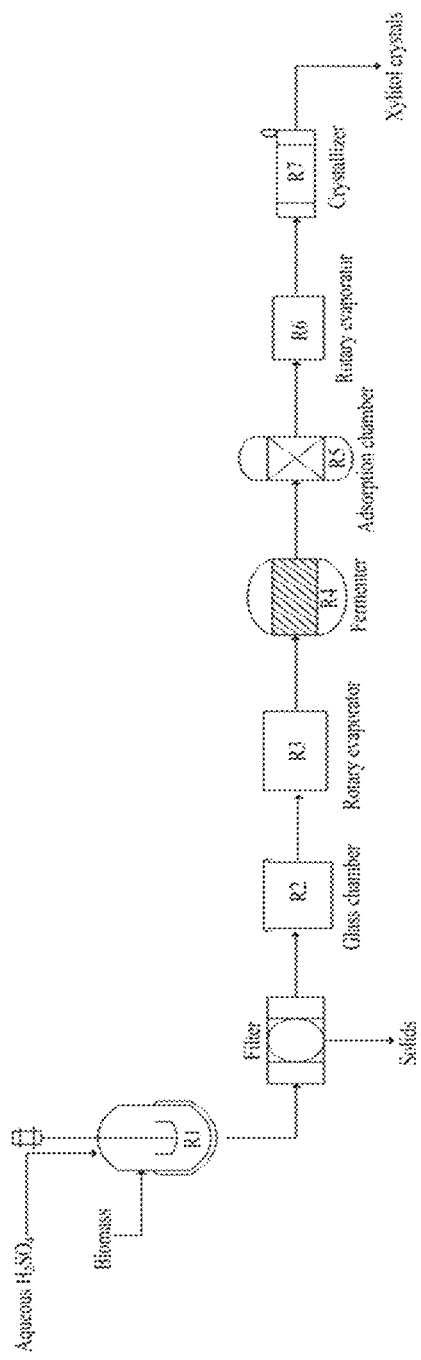
FIG. 10 represents the process flow diagram for xylitol production.

The schematic diagram for the process is represented in FIG. 10 depicting the different steps in the process of xylitol production from agricultural residue.

Along with detoxification, the process concentrates the xylose in the liquid hydrolysate by ~2 fold which results in energy saving by ~0.72 kW/per L of the hydrolysate (equivalent to Rs 4.68).

Economic saving: Rs 7.5 (material)+Rs 4.68 (Energy)=Rs 12.18/L of hydrolysate (Assuming 3% w/v, AC loading with a bulk price of Rs 250/kg of adsorbent)

1 kW of electricity equivalent to Rs 6.5.

In terms of economic significance, the current invention saves both in terms of material and energy expenditure.

EXAMPLES

The following examples are given by way of illustration and therefore should not be construed to limit the scope of the invention.

The quantitative analysis of the components xylose, glucose, xylitol, acetic acid, glycerol, furfural, and HMF have been carried out in HPLC with the following conditions:

Column: Aminex HPX-87H (300×7.8 mm) manufactured by Bio-Rad Laboratories Column oven temperature: 55° C.

Eluent: 5 mM H$_2$SO$_4$ with a pump flow rate of 0.55 mL/min in isocratic mode Detection: RI detector.

Example-1: Detoxification and Concentration of Lignocellulosic Hydrolysate

Figure 2:
FIG. 2 represents a model glass chamber for detoxification of hydrolysate.

The transparent glass chamber was placed under direct sunlight. A glass tray filled with 2 L of neutralized acid-treated lignocellulosic hydrolysate (pH 4.5) with a furfural and xylose content of 2.4 g/L and 33 g/L respectively was placed inside the transparent glass chamber. The evaporation of liquid hydrolysate begins after nearly 1 h of exposure to sunlight (FIG. 2). The volume of the liquid hydrolysate is reduced to almost half of the initial volume after 48 h of the treatment and analyzed for furfural and xylose content. The analysis of the concentrated hydrolysate has shown that the efficiency of furfural removal by the method was >99% and increased the xylose concentration by two-fold.

| Composition of acid hydrolysate | Xylose (g/L) | Glucose (g/L) | Acetic acid (g/L) | HMF (g/L) | Furfural (g/L) |
|---|---|---|---|---|---|
| Before treatment | 33.547 | 3.467 | 1.267 | 0.38 | 2.446 |
| After detoxification | 66.71 | 6.90 | 2.584 | 0.604 | 0 |

Example-2: Xylitol Fermentation of Detoxified and Non-Detoxified Liquid Hydrolystae by Biocatalyst The detoxified and non detoxified liquid hydrolysate (as in Table 3) were evaluated as the feed for xylitol production by the biocatalyst. The liquid hydrolysates supplemented with salts (composition mentioned in table 4) was used for fermentation studies. Grown Pichia caribicca cells MTCC 2703 were innoculated in 2 L baffled flasks with 1 L of fermentation media to achieve a sugar to cell ratio of 1:10. Cells were cultivated in a shaker incubator at 29° C. and analyzed for xylitol producing ability from the two different feeds. The biocatalyst cultivated on untreated liquid hydrolysate demonstrated little or no xylose consumption without any xylitol production. However, cells cultivated on detoxified hydrolysate produced xylitol with significant yields and demonstrated 95% xylose consumption (Table 1). This indicated that detoxification using the custom designed glass chamber had a positive impact on xylose conversion and xylitol yields.

TABLE 4

Composition of salts used in fermentation media

| Salts | g/L |
|---|---|
| Ammonium sulfate | 1 |
| Di-sodium phosphate | 0.15 |
| Monopotassium phosphate | 0.15 |
| Yeast extract | 1 |
| Magnesium sulphate | 0.06 |

Example-3: Xylitol Production from Liquid Hydrolysate with Cell Recycling

Figure 3:
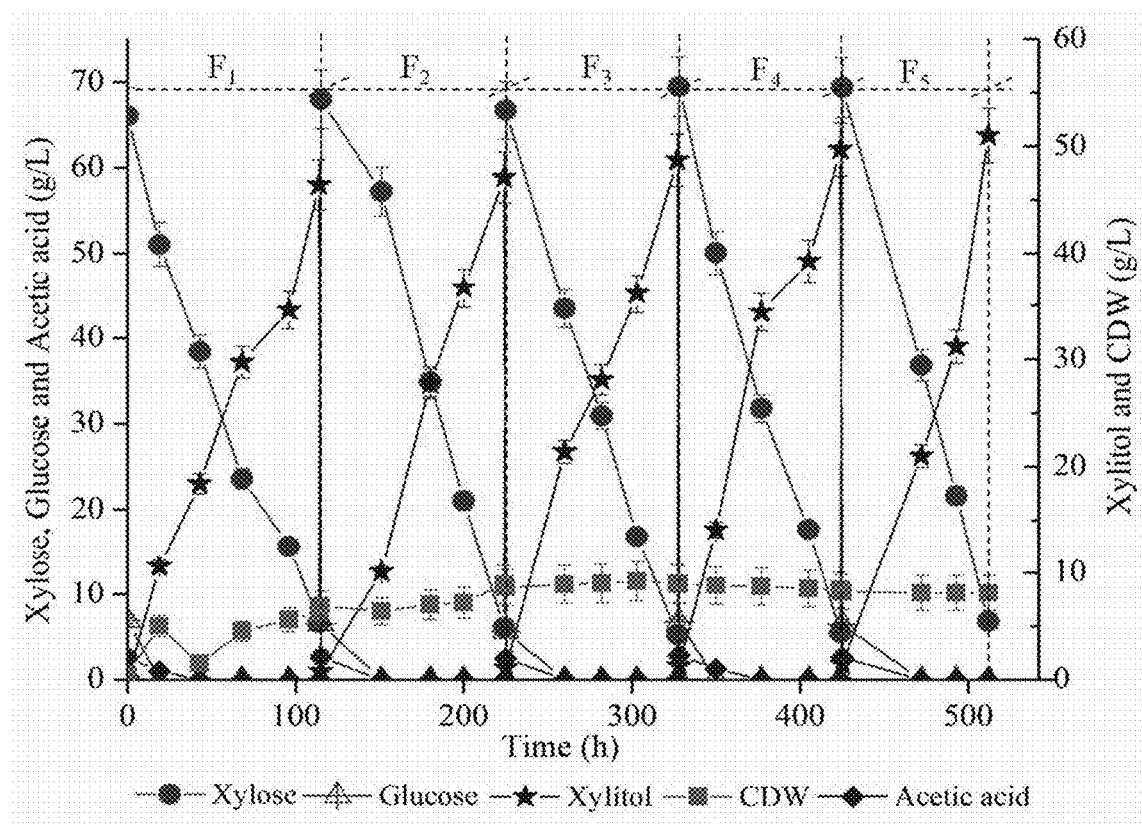
FIG. 3 represents xylitol production with cell recycle. $F_1$ to $F_5$ indicates the 5 fermentation cycles with cell recycle

The biocatalyst was evaluated for its recyclability and stability studies. The detoxified corncob hydrolysate (supplemented with salts as mentioned in Table-4) was fermented by the biocatalyst in a 7 L bioreactor. The fermentation parameters were controlled, such that the temperature was 28° C., the agitation of the fermentation and pH maintained at 150 rpm and pH 6.0, respectively. After the first fermentation cycle, the biocatalyst was recovered by centrifugation and evaluated for 4 successive fermentation cycles with the addition of fresh hydrolysate in the fermenter. The biocatalyst showed excellent stability up to a fermentation period of >500 hours with no loss in activity (FIG. 3). The maximum xylitol titer attained was 50.33 g/L with a yield of ~0.79-0.81 g/g. The xylitol titer in the broth after successive recycling increased by 10.2%.

Figure 4:
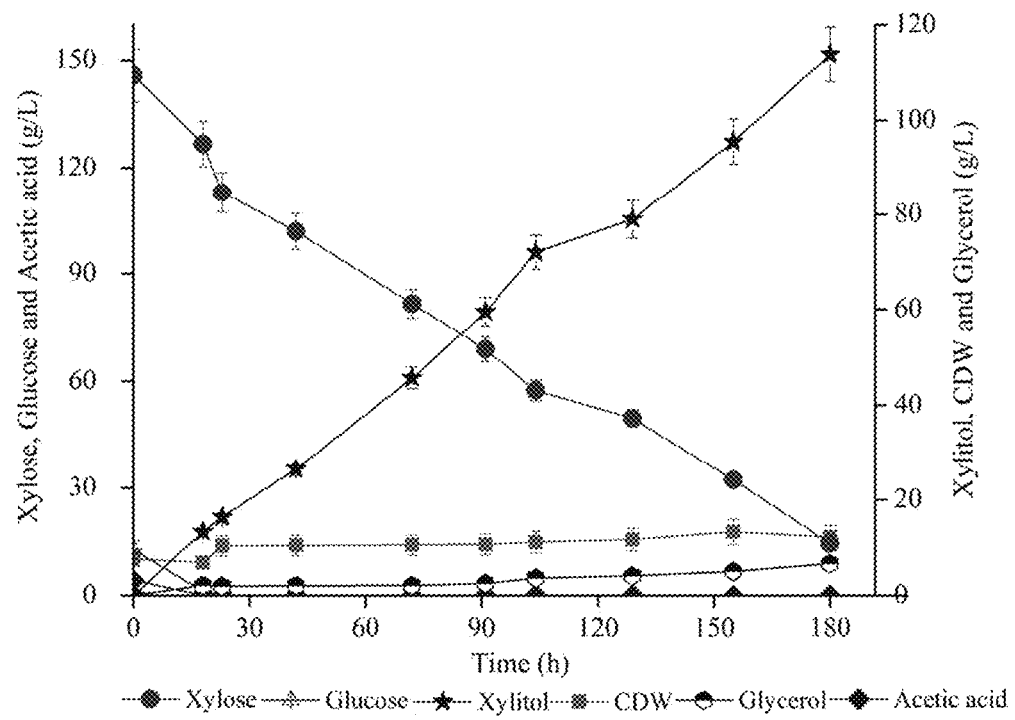
FIG. 4 represents the time scale graph of xylitol production at 0.5 vvm (volume of air/volume of media) and xylose concentration of 150 g/L

Example-4: Fermentation of Lignocellulosic Hydrolysate with Varying Initial Xylose Concentration The detoxified corncob hydrolysate (as in Table 3) supplemented with salts (as mentioned in Table 4) and concentrated to attain xylose concentrations of 100, and 150 g/L was fermented using the biocatalyst in the bioreactor. The aeration inside the bioreactor was maintained at 3.5 L/min (0.5 vvm), temperature-controlled at 28° C. and pH maintained at 6.0. The sugar to cell ratio inside the fermenter was 10:1. The xylitol yield ranges from 0.78-0.87 g/g when the initial xylose concentration varies from 66 to 100 g/L, and attains a value of 0.83 g/g when the initial xylose concentration is nearly 150 g/L (Table 5, FIG. 4). Glucose, present in the hydrolysate during fermentation (6.90-12.8 g/L) was rapidly consumed within the first 10 hours. It was used up by the cell for cell biomass accumulation since a significant increase in dry cell weight was observed. A part of it was also be utilized for maintenance energy in ATP generation and cofactor (NADPH) regeneration, which was revealed by the transcript abundance of Glucose 6 phosphate dehydrogenase genes in the transcriptome data analysis. Ethanol or any other metabolite (from glucose) during fermentation is not detected. The biocatalyst produced a maximum of 113.9 g/L xylitol (from 150 g/L xylose in lignocellulosic hydrolysate) with a yield of 0.83 g/g using an initial cell concentration of 12-15 g/L. ~90% of the xylose was consumed as the substrate during fermentation. The xylitol selectivity was estimated as 96.22%. Glycerol was obtained as a by-product during fermentation with a yield of 0.037 g/g.

TABLE 5

Xylitol production under varying xylose concentration

| Initial xylose concentration in the liquid hydrolysate (g/L) | Xylitol titer (g/L) | Xylitol yield (g/g) | Xylitol selectivity (%) |
|---|---|---|---|
| 66.71 | 51.03 | 0.79 | 94 |
| 102 | 80.43 | 0.87 | 98 |
| 145.8 | 113.9 | 0.83 | 96.22 |

| Block | Step | Name of equipment | Inlet | | Outlet | |
|---|---|---|---|---|---|---|
| | | | Material name | Mass (kg) | Material name | Mass (kg) |
| R1 | Biomass hydrolysis | Biomass digester | Biomass (feed) | 3.5 | Bioamass hydrolysate (BHL) | 24.5 |
| | | | Water | 28 | | |
| | | | H₂SO₄ | 0.124 | | |
| R2 | Feed detoxification (in batches) | Glass chamber | BHL | 24.5 (in batches) | Concentrated biomass hydrolysate 1 (CBHL1) | 12 |
| R3 | Evaporation (in batches) | Rotary vacuum evaporator | CBHL1 | 12 (in batches) | Concentrated biomass hydrolysate 2 (CBHL2) | 5.702 |

TABLE 5-continued

Xylitol production under varying xylose concentration

| R4 | Fermentation | Bioreactor | CBHL2 | 5.702 | Xylitol liquor (XL) | 4.97 |
| --- | --- | --- | --- | --- | --- | --- |
| | | | Biocatalyst | 0.010 | | |
| R5 | Adsorption | | XL | 4.97 | Treated XL (TXL) | 4.90 |
| R6 | Evaporation (Evap-2) | Rotary vacuum evaporator | TXL | 4.90 | Conc. treated xylitol liquor (CTXL) | 0.7 |
| R7 | Crystallization | | CTXL | 0.7 | Xylitol-solid (XS) | 0.506 |

Example-5: Xylitol Recovery from Broth by Crystallization and Characterization

Xylitol crystals (FIG. 5) with yields varying between 75% to 85% were recovered from the fermentation broth by crystallization. The recoveries were higher at a lower temperature (−20° C.) when compared to 0° C. The addition of seed crystals did not improve the crystallization yield.

Example-6

3.5 kg of biomass can be converted to 0.502 kg of xylitol crystals with a degree of purity of 96.9%. The detailed material balance is depicted in table below (Table 6) as per the process flow diagram (FIG. 10).

TABLE 6

| Block | Step | Name of equipment | Inlet | | Outlet | |
| --- | --- | --- | --- | --- | --- | --- |
| | | | Material name | Mass (kg) | Material name | Mass (kg) |
| R1 | Biomass hydrolysis | Biomass digester | Biomass (feed) | 3.5 | Bioamass hydrolysate (BHL) | 24.5 |
| | | | Water | 28 | | |
| | | | $H_2SO_4$ | 0.124 | | |
| R2 | Feed detoxification (in batches) | Glass chamber | BHL | 24.5 (in batches) | Concentrated biomass hydrolysate 1 (CBHL1) | 12 |
| R3 | Evaporation (in batches) | Rotary vacuum evaporator | CBHL 1 | 12 (in batches) | Concentrated biomass hydrolysate 2 (CBHL2) | 5.702 |
| R4 | Fermentation | Bioreactor | CBHL2 | 5.702 | Xylitol liquor (XL) | 4.97 |
| | | | Biocatalyst | 0.010 | | |
| R5 | Adsorption | | XL | 4.97 | Treated XL (TXL) | 4.90 |
| R6 | Evaporation (Evap-2) | Rotary vacuum evaporator | TXL | 4.90 | Conc. treated xylitol liquor (CTXL) | 0.7 |
| R7 | Crystallization | | CTXL | 0.7 | Xylitol-solid (XS) | 0.506 |

ADVANTAGES OF THE INVENTION

The invention describes a simple method for detoxification and concentrating the lignocellulosic biomass hydrolysate in a single step using only solar light as the energy source.

The fermentation process not only provides good product yield but also produces xylitol with high selectivity.

The biocatalyst operates at low temperature (28° C.) and pressure (1.2 atm) and has minimum nutritional requirements, which lowers the media cost.

The biocatalyst can convert xylose into xylitol for 5 successive fermentation cycles and shows stability of more than 500 h without any reduction in product yields thus resulting into the reduction in manufacturing cost.

The downstream process results in high xylitol recoveries (~85%) with high purity (>96%) resulting into the reduction in downstream purification cost by at least 5%.

We claim:

1. A process for the simultaneous detoxification and concentration of xylose rich biomass derived liquid hydrolysate using a custom-designed glass chamber, wherein said process comprises the steps of:
   i. hydrolysing the biomass for the pretreatment by using dilute sulphuric acid, wherein the ratio of biomass and sulphuric acid is 1:8 at a temperature in the range of 138° C.-140° C. with a holding time period in the range of 85-90 minutes at 100-120 rpm to obtain a biomass slurry;
   ii. passing the discharged biomass slurry as obtained in step i) through a squeezer for solid-liquid separation to obtain a xylose rich liquid solution;
   iii. keeping the xylose rich liquid solution as obtained in step ii) in a solar concentrator and exposing to sunlight at a temperature in the range of 25° C. to 45° C. for a period in the range of 47-48 hours to obtain the substantially furfural free xylose rich acid hydrolysed detoxified hydrolysate, wherein, the said detoxification and concentration process resulted in removal of ~95% of furfural in the acid hydrolysed xylose rich lignocellulosic composition.

2. The process as claimed in claim 1, wherein said detoxification and concentration process resulted in removal of ~99% of furfural in the acid hydrolysed xylose rich lignocellulosic composition.

3. A process for the production of crystalline xylitol from detoxified and concentrated lignocellulosic biomass obtained by the process as claimed in claim 1, in the presence of a whole-cell biocatalyst, wherein the process comprises the steps of:
   a) concentrating the dotoxified and concentrated xylose rich biomass derived liquid hydrolysate broth further by using a rotary vacuum evaporator to achieve a xylose concentration of 66, 100 and 150 g/L;

b) monitoring the xylitol production from concentrated biomass hydrolysate (at varying xylose concentration) obtained at step a) by *Pichia caribicca* MTCC 5703 strain in a bioreactor with a supervisory control and a data acquisition (SCADA) system;

c) controlling the fermentation parameters by maintaining the biomass obtained at step b) at a temperature in the range of 28-30° C., agitation at 150-200 rpm, and the pH of the system at 6.0-6.5;

d) allowing the cells to settle down of the biomass obtained at step c) after fermentation;

e) siphoning out the xylitol rich broth obtained at step d) from the fermenter and decolorizing by activated carbon treatment (5% w/v);

f) filtering and concentrating the filtrate with a xylitol content of 8-12% by weight obtained at step e) in a rotary evaporator at 80° C. under vacuum (0.5 atm) to achieve a xylitol content of 80-90% by weight;

g) cooling the filtrate obtained at step f) gradually from 60° C. to 25° C. over a period of about 1-2 hours while controlling the temperature and then keeping at a temperature in the range of ~20° C. to 0° C. for 5 days to complete the crystallization of xylitol;

h) separating and drying the crystals to obtain crystalline xylitol.

4. The process as claimed in claim 3, wherein said produced xylitol from lignocellulosic biomass hydrolysate is with high yields and selectivity, wherein the maximum yield is 0.87 g/g with a product selectivity of >96%.

5. The process as claimed in claim 3, wherein said process results in ~85% xylitol recovery from the broth in the form of crystals with a degree of purity of >96.9%.

6. The process as claimed in claim 3, wherein the Xylitol crystals demonstrated no toxic effect on HepG2 cell lines when assayed for cytotoxicity studies.

* * * * *